United States Patent [19]

Horng

[11] Patent Number: 5,951,312
[45] Date of Patent: Sep. 14, 1999

[54] ACCOMMODATING HINGE MECHANISM

[76] Inventor: Chin-Fu Horng, 5F, No. 2, Alley 6, Lane 36, Tsu-Hsiu Rd., Tai Shan, Taipei Hsien, Taiwan

[21] Appl. No.: 08/898,288

[22] Filed: Jul. 22, 1997

[51] Int. Cl.[6] .............................. H01R 3/00; E05D 11/00
[52] U.S. Cl. ............................................. 439/165; 16/223
[58] Field of Search ........................ 439/165, 31; 16/223

[56] References Cited

U.S. PATENT DOCUMENTS

| | | | |
|---|---|---|---|
| 5,390,075 | 2/1995 | English et al. | 439/165 X |
| 5,751,544 | 5/1998 | Song | 439/165 X |
| 5,827,082 | 10/1998 | Laine | 439/165 OR |

*Primary Examiner*—Paula Bradley
*Assistant Examiner*—Daniel Wittels
*Attorney, Agent, or Firm*—Rosenberg, Klein & Bilker

[57] ABSTRACT

The subject invention relates to a type of accommodating hinge mechanism, comprising two positioning plates, an inner shaft and an outer shaft; the inner shaft and the outer shaft are respectively joined to a positioning plate; the inner shaft is inserted inside the outer shaft, and so positioned by the matching jutted ring and the dented ring to compose a hinge mechanism; the two positioning plates serve to position the LCD monitor and the main unit of a notebook computer; the connecting wires of the LCD monitor and the main unit can pull through the slots of the positioning plate, the inner shaft and the outer shaft to inside the inner shaft, and then the slot on the inner shaft is sealed; by way of said mechanism, the hinge serves to accommodate the connecting wires and hide them inside the hinge, thus avoiding the need to reserve additional space for the connecting wires.

2 Claims, 4 Drawing Sheets

ACCOMMODATING HINGE MECHANISM

BACKGROUND OF THE INVENTION

The subject invention relates to a type of accommodating hinge mechanism, particularly to one that will be able to accommodate the connecting wiring inside its interior.

Conventionally, a notebook computer's main unit is joined to its LCD monitor by a hinge, so that the main unit and the LCD monitor can be hinged as one unit, whereby the LCD monitor can be opened from or closed to the main unit with the hinge serving as a fulcrum.

However, such a prior art of hinge mechanism needs additional space to be reserved to accommodate the connecting wiring of the main unit and LCD monitor; meanwhile, the exposed connecting wires would mar the appearance; and there would be the worry that the connecting wires might be damaged.

Therefore, it is quite obvious that a prior art of hinge mechanism does include said inconvenience and disadvantage in actual applications that need improvement.

In view of the above, the subject inventor has devoted intensive study, with theoretical applications, in the improvement on the above disadvantages, and has presented the reasonably designed subject invention that will effectively improve the above disadvantages.

The main purpose of the subject invention is to provide a type of accommodating hinge mechanism, comprising two positioning plates, an inner shaft and an outer shaft; the inner shaft and the outer shaft are respectively positioned to the positioning plate; the inner shaft is inserted inside the outer shaft, and positioned by a jutted ring and a dented ring to compose a hinge mechanism; the two positioning plates can be fixed on the LCD monitor and the main unit of a notebook computer; the connecting wiring of the LCD monitor and the main unit can be pulled from the section groove of the positioning plates, the inner shaft and the outer shaft into the interior of the inner shaft; while the section groove of the inner shaft is sealed by a plug body to hide the connecting wiring inside the inner shaft; the hinge serves as an accommodating tube to hide the connecting wiring inside, so that there is no need of reserving a space for the connecting wiring; the hidden connecting wiring will enable a better appearance and freedom from scraping and damage.

The designing approaches and functions of the subject invention to achieve the above purpose and configuration are described in details below, with drawings and embodiment:

| Brief Description of Numerals | | | | |
|---|---|---|---|---|
| 10 | | positioning plate | | |
| | 11 | positioning hole | 12 | slot |
| | 13 | dowel hole | | |
| 20 | | inner shaft | | |
| | 21 | dowel pin | 22 | slot |
| | 23 | jutted ring | 24 | stuffing |
| 30 | | outer shaft | | |

| Brief Description of Numerals | | | |
|---|---|---|---|
| | 31 | dowel pin | 32 slot |
| | 33 | dented ring | |
| 34 | | main unit | |
| 35 | | LCD monitor | |
| 36 | | connecting wiring | |

DETAILED DESCRIPTION OF THE INVENTION

Figure 1:
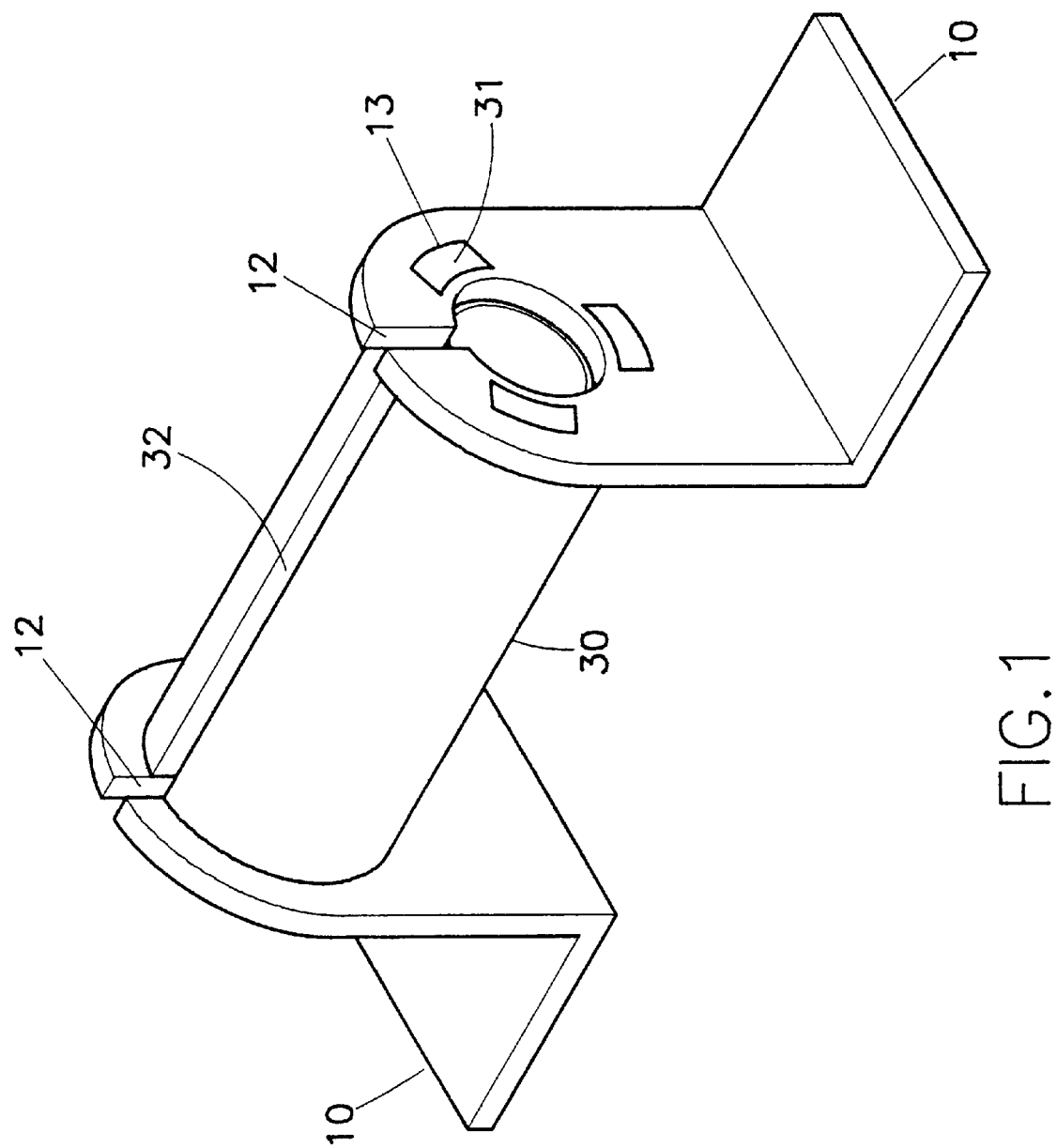
FIG. 1 is the perspective assembled view of the subject invention.
Figure 2:
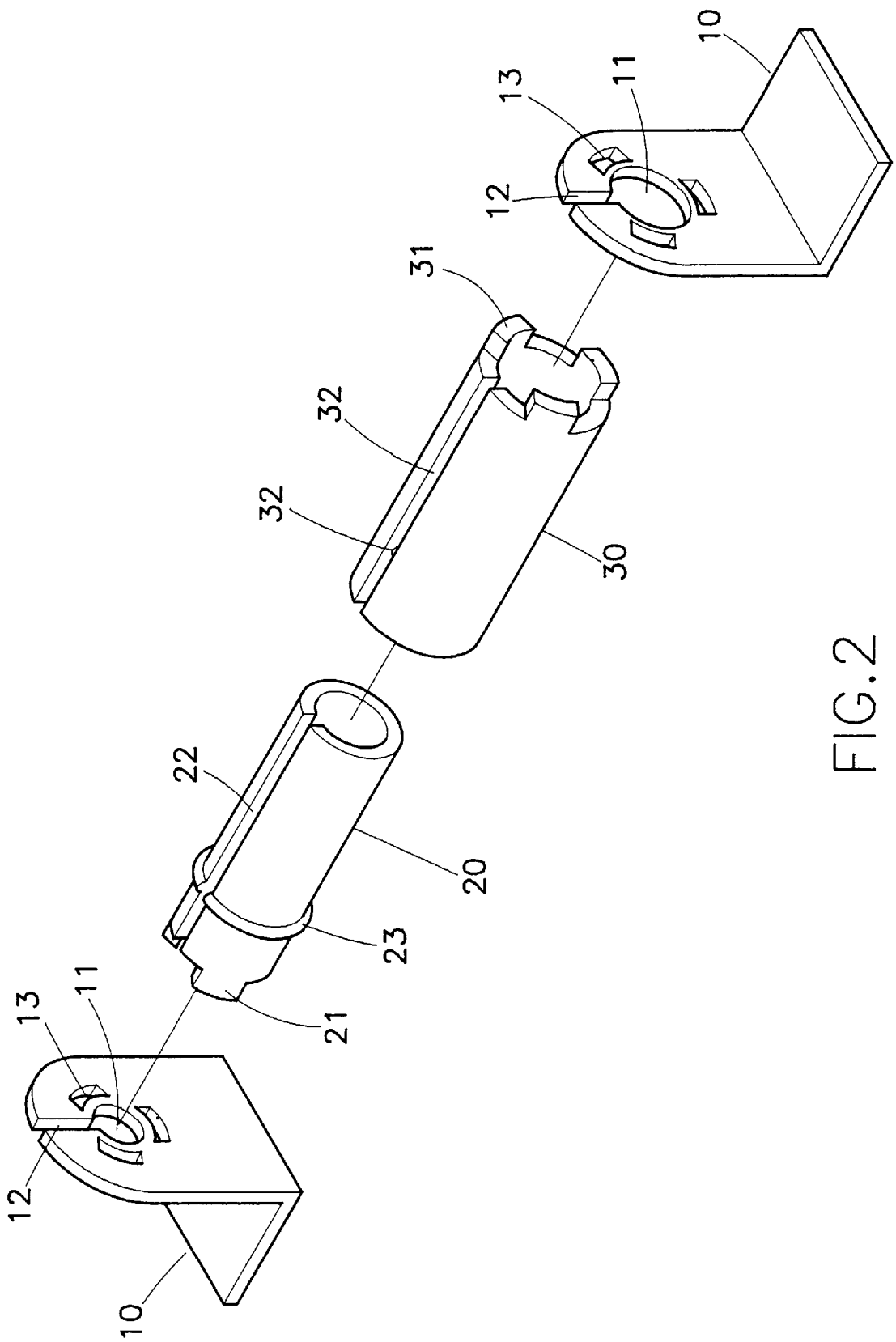
FIG. 2 is the exploded view of the subject invention.
Figure 3:
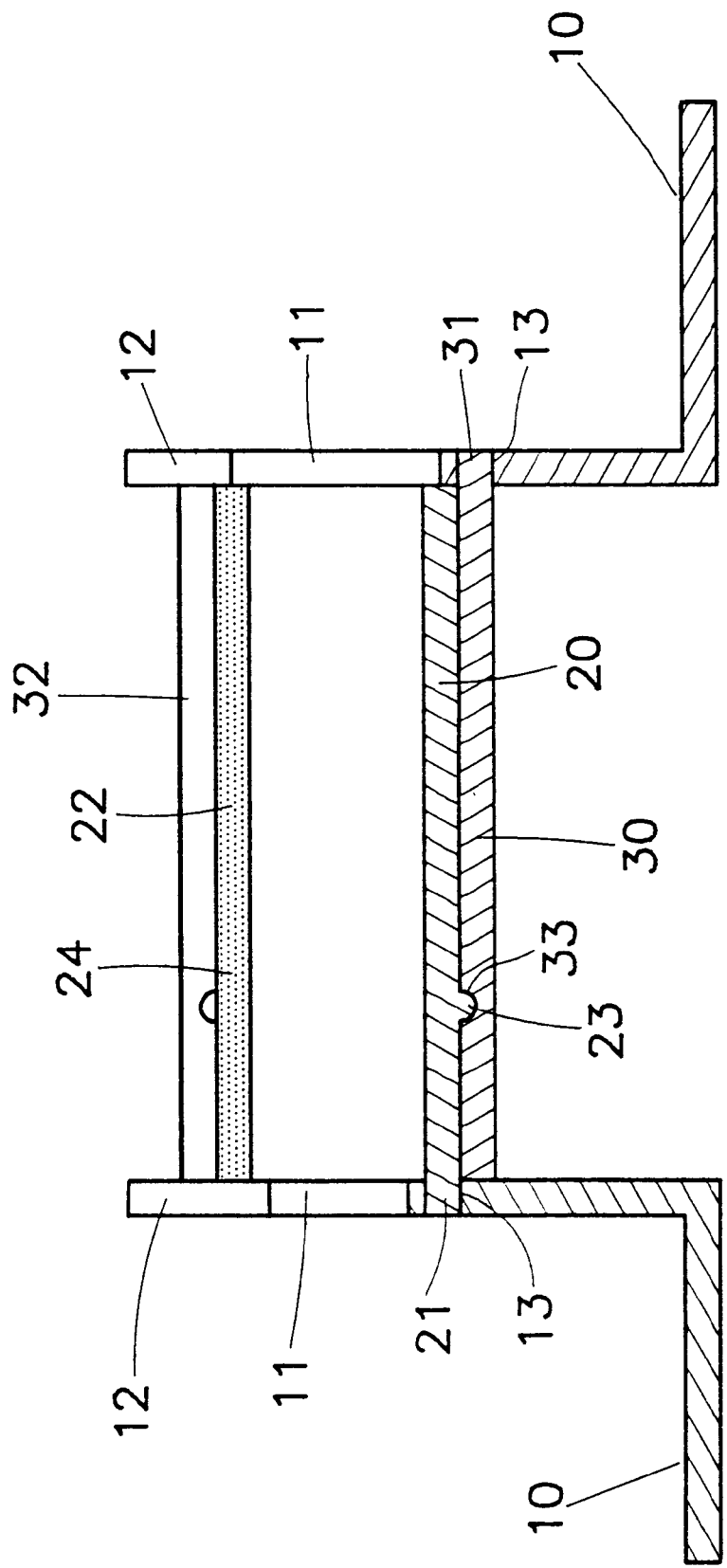
FIG. 3 is the plain sectional view of the subject invention.

Referring to FIGS. 1, 2 and 3, which are respectively the perspective, assembled view, the exploded view and the plain sectional view of the subject invention, the subject invention relates to the providing of a type of accommodating hinge mechanism, comprising two positioning plates 10, an inner shaft 20 and an outer shaft 30; said positioning plate 10 is L-shaped, its exterior form can be changed as required; on each of the two positioning plates 10 respectively is a round positioning hole 11; on top of the positioning hole 10 is a slot 12, said slot 12 extends at two ends to the edge of the positioning plate 10; outside the rim of the positioning hole 11 are several dowel holes 13.

The inner shaft 20 is a hollow cylinder with one end so shaped to have several dowel pins 21 that correspond to the dowel holes 13 on the positioning plate 10; on said inner shaft 20 is a slot running lengthwise on the shaft; on the outer wall of the inner shaft 20 is fitted with a jutted ring 23.

The outer shaft is a hollow cylinder, with its inner diameter approximately the same as the outer diameter of the inner shaft; one end of said outer shaft 30 is so shaped to have several dowel pins 31 that correspond to the dowel holes 13 on another positioning plate 10; on said outer shaft 30 is a slot 32 running lengthwise on the shaft; on the inner wall of the outer shaft 30 is a dented ring 33.

To assemble the subject invention, insert the dowel pins 21 on the inner shaft 20 into the dowel holes 13 on one positioning plate 10, and insert the dowel pins 31 on the outer shaft 30 to the dowel holes 13 on another positioning plate 10; so, the inner shaft 20 and the outer shaft 30 are respectively joined to a positioning plate 10; then, insert the inner shaft 20 into the outer shaft 30, so the jutted ring 23 and the dented ring 33 are matched into position, to prevent longitudinal dislocation of the inner shaft 20 and the outer shaft 30; thus, the hinge mechanism is composed.

Figure 4:
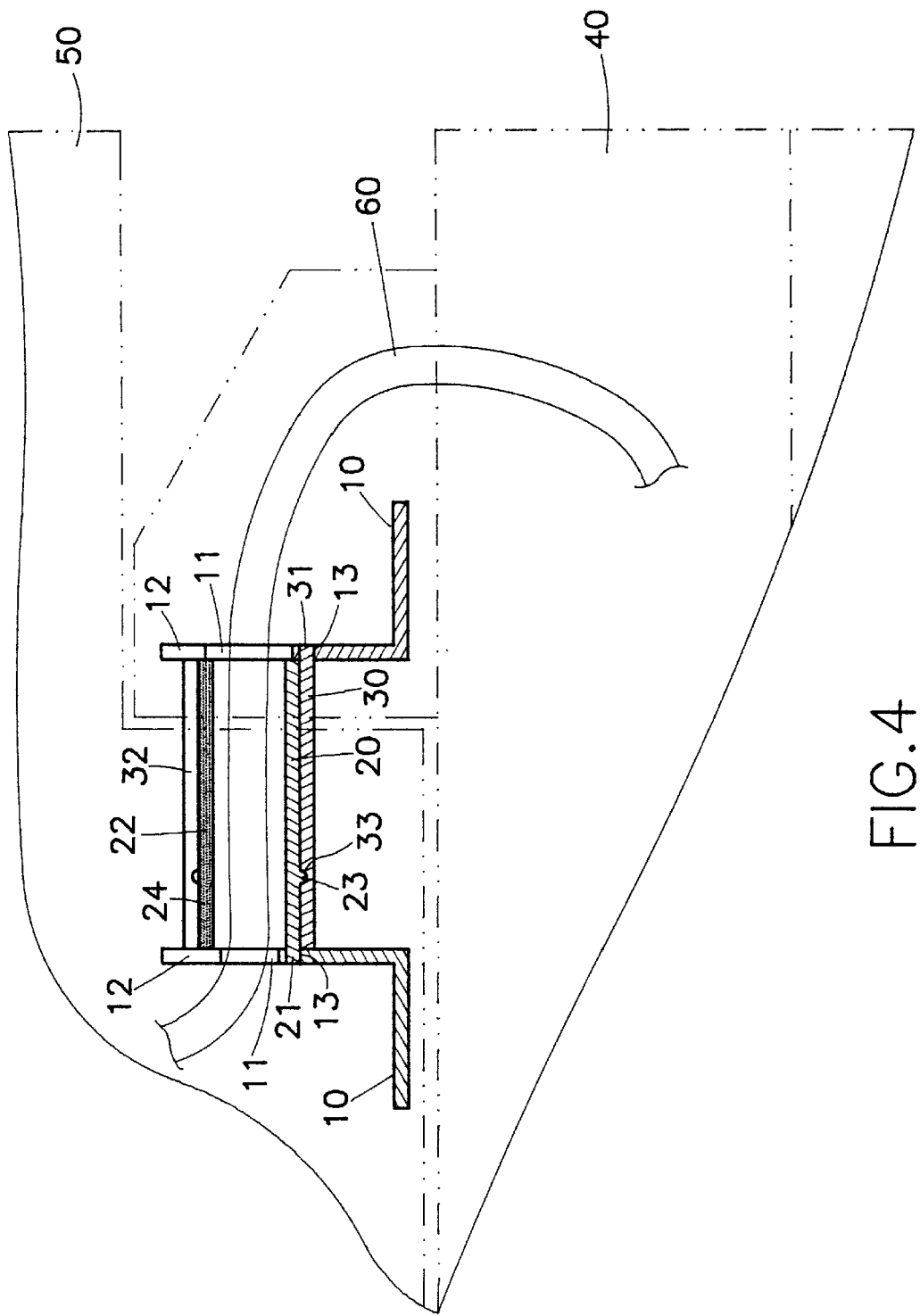
FIG. 4 is the perspective view of the subject invention when installed onto a notebook computer.

Referring to FIG. 4, which is the perspective view of the subject invention when it is installed on a notebook computer, the subject invention of hinge can be mounted between the main unit 40 and the LCD monitor 50 of the notebook computer; wherein the two positioning plates 10 are respectively fixed onto the main unit 40 and the LCD monitor 50, so that the main unit 40 and the LCD monitor 50 can be properly hinged as one unit; and the LCD monitor 50 can be opened up or closed down onto the main unit 40 with the hinge serving as the fulcrum.

As shown in FIG. 4, the connecting wiring 60 between the LCD monitor 50 and the main unit 40 will be pulled through the slots 12, 22 and 32 on the positioning plate 10, the inner shaft 20 and the outer shaft 30 to the interior of the inner shaft 20, then, the slot 22 on the inner shaft 20 is sealed with a stuffing 24 of PVC or equivalent materials, to hole and hide the connecting wiring 60 inside the inner shaft 20, so that it will not escape; Since the subject invention is so designed that the hinge will accommodate the connecting wiring 60 and hide it inside, there is no need to reserve a space for the connecting wire 60; the hidden type of connecting wire 60 will be better-looking and there will be no worry of it being scraped or damaged.

Summing up, the subject invention, with its improvement on the conventional hinge with exposed connecting wires that require an additional space to be reserved, or such problems, is indeed an unprecedented invention with its novelty and inventive step that will fully satisfy the requirements for the application for a patent. In accordance with the Patent Law, this application is filed to protect the subject inventor's rights and interests. Your favorable will be appreciated.

It is hereby declared that the above description, covering only the preferred embodiment of the subject invention, should not be based to limit or restrict the subject claim, and that all equivalent variations deriving from the subject description and drawings should reasonably be included in the intent and claim of the subject invention.

I claim:

1. A hinge mechanism comprising:

(a) a first and second positioning plate, each of said first and second plates having a respective wall member, each of said wall members having a through hole formed through a respective wall member, each of said through holes in open communication with a respective slot extending in a vertical direction to a periphery of each of said wall members, each of said wall members having a plurality of dowel holes formed therein;

(b) an inner shaft having an inner shaft longitudinally extending through opening and an end formed with a plurality of inner shaft dowel pins insertable within said dowel holes formed in said first position plate, said inner shaft having a ring member passing around an outer circumference thereof, and an inner shaft slot extending throughout a longitudinal extension of said inner shaft;

(c) an outer shaft having an end formed with a plurality of outer shaft dowel pins insertable within said dowel holes formed in said second positioning plate, said outer shaft having an outer shaft slot extending throughout a longitudinal extension of said outer shaft, said outer shaft having a circumferential recess formed within an inner wall for receipt of said inner shaft ring member, said inner shaft having an external diameter substantially equal to an internal diameter of said outer shaft for receipt of said inner shaft within said outer shaft, whereby said first positioning plate is adapted to be fixed to an LCD monitor and said second positioning plate is adapted to be fixed to a main housing of a notebook computer and a plurality of electrical coupling wires may be inserted into said inner shaft through opening by passage through said inner shaft and outer shaft slots.

2. The hinge mechanism as recited in claim 1 wherein each of said first and second positioning plates is L-shaped.

* * * * *